United States Patent
Piontek et al.

(10) Patent No.: US 12,292,154 B2
(45) Date of Patent: May 6, 2025

(54) PIPE COUPLING SLEEVE ASSEMBLY

(71) Applicant: Total Piping Solutions, Inc., Olean, NY (US)

(72) Inventors: Daryl M. Piontek, Great Valley, NY (US); Raymond C. Minich, Bradford, PA (US)

(73) Assignee: Dresser Water, LLC, Houston, TX (US)

( * ) Notice: Subject to any disclaimer, the term of this patent is extended or adjusted under 35 U.S.C. 154(b) by 390 days.

(21) Appl. No.: 17/919,070

(22) PCT Filed: Apr. 21, 2021

(86) PCT No.: PCT/US2021/028366
§ 371 (c)(1),
(2) Date: Oct. 14, 2022

(87) PCT Pub. No.: WO2021/216685
PCT Pub. Date: Oct. 28, 2021

(65) Prior Publication Data
US 2023/0160517 A1 May 25, 2023

Related U.S. Application Data

(60) Provisional application No. 63/013,355, filed on Apr. 21, 2020.

(51) Int. Cl.
*F16L 17/02* (2006.01)
*F16L 21/06* (2006.01)
*F16L 55/172* (2006.01)

(52) U.S. Cl.
CPC ........... *F16L 55/172* (2013.01); *F16L 21/065* (2013.01)

(58) Field of Classification Search
CPC . F16L 17/00; F16L 17/02; F16L 17/03; F16L 17/04; F16L 17/06; F16L 21/065; F16L 55/17; F16L 55/1705; F16L 55/172; F16L 55/1725; F16L 55/178; F16L 23/08; F16L 23/22; F16L 23/16; F16L 23/18
See application file for complete search history.

(56) References Cited

U.S. PATENT DOCUMENTS

| | | |
|---|---|---|
| 4,391,458 A | 7/1983 | Blakeley |
| 4,417,755 A | 11/1983 | Gittleman |
| 6,168,210 B1 | 1/2001 | Bird |
| 6,170,884 B1 | 1/2001 | McLenann et al. |

(Continued)

*Primary Examiner* — Aaron M Dunwoody
(74) *Attorney, Agent, or Firm* — Harter Secrest & Emery LLP

(57) ABSTRACT

A conduit coupling assembly having an arcuate middle ring extending axially between first and second arcuate clamp rings, an arcuate gasket configured to be positioned radially between the first clamp ring and the fluid conduit, the middle ring comprising an outwardly extending annular flange disposed axially between and radially overlapping at least a portion of the first clamp ring and at least a portion the gasket, the annular flange comprising an axially extending retention rim axially overlapping and disposed radially between a first retained portion of the gasket and an opposed portion of the first clamp ring, the retention rim and the gasket forming a gasket retaining element restraining radial movement of a side surface of the gasket relative to the annular flange of the middle ring.

8 Claims, 6 Drawing Sheets

(56) References Cited

U.S. PATENT DOCUMENTS

| | | | |
|---|---|---|---|
| 6,302,450 B1 | 10/2001 | Dole et al. | |
| 7,654,586 B2 * | 2/2010 | Krausz | F16L 17/04 285/369 |
| 8,776,351 B2 | 7/2014 | Bird et al. | |
| 2006/0061090 A1 * | 3/2006 | Krausz | F16L 17/04 285/110 |
| 2007/0273151 A1 * | 11/2007 | Krausz | F16L 55/172 285/406 |
| 2008/0224464 A1 * | 9/2008 | Krausz | F16L 25/12 285/31 |
| 2010/0327576 A1 | 12/2010 | Linhorst et al. | |
| 2014/0319826 A1 * | 10/2014 | Chiproot | F16L 17/04 285/337 |
| 2017/0074433 A1 | 3/2017 | Beagen, Jr. | |
| 2019/0331265 A1 | 10/2019 | Bowman | |
| 2023/0160517 A1 * | 5/2023 | Piontek | F16L 21/065 138/99 |
| 2024/0068608 A1 * | 2/2024 | Chiproot | F16L 23/22 |

* cited by examiner

PIPE COUPLING SLEEVE ASSEMBLY

TECHNICAL FIELD

The present invention relates generally to the field of fluid conduit repair and couplings, and more particularly to an improved pipe coupling sleeve assembly.

BACKGROUND ART

Split repair and encapsulating sleeves or clamps are used in the repair or reinforcement of pipes. For example, conventional assemblies for coupling and sealing adjacent ends of two adjacent pipe sections include a sleeve, shell, ring or collar with each pipe end extending into a respective end of the sleeve. Gaskets are placed between the sleeve and each pipe end, respectively, such that tightening the sleeve to the pipe sections compresses the gasket against the pipe ends, thereby sealing the pipe coupling to the pipes.

U.S. Pat. No. 6,168,210, entitled "Pipe Coupling," discloses a sleeve, flanges and gaskets that are coupled together via bolts to compress the gaskets against pipe ends as the flanges are drawn towards each other. U.S. Pat. No. 4,391,458, entitled "Pipe Coupling With Gasket Locating Means," discloses a pipe coupling having a split housing surrounding a split-ring gasket. U.S. Patent Application Publication No. 2010/0327576, entitled "Pipe Coupler and Gasket With Positive Retention and Sealing Capability," discloses a coupler which provides positive retention of a gasket about the circumference of the coupler. U.S. Pat. No. 8,776,351, entitled "Split-Ring Gland Pipe Coupling With Corrugated Armor," discloses a pipe coupling for coupling adjacent ends of a pair of pipes that includes a sleeve, a split-ring gland positioned around one of the ends of the sleeve, and an annular gasket positioned within the split-ring gland and configured to be compressed by the split-ring gland for sealing one pipe end to the sleeve. U.S. Pat. No. 7,654,586, entitled "Pipe Seal Element," is directed to a gasket that maintains contact with a pipe and a flange during and after seal compression.

BRIEF SUMMARY OF THE INVENTION

With parenthetical reference to corresponding parts, portions or surfaces of the disclosed embodiment, merely for the purposes of illustration and not by way of limitation, an improved conduit coupling assembly (15) configured to clamp to a fluid conduit (19) oriented about a longitudinal axis (x-x) is provided comprising: an arcuate first clamp ring (16) having a first longitudinal edge (28A) and a second longitudinal edge (28B); a first connecting assembly (18) configured to tighten the first clamp ring (16) to the fluid conduit (19) from a non-actuated position to a tightened position; an arcuate first gasket (25) configured to be positioned radially between the first clamp ring (16) and the fluid conduit (19); the first clamp ring (16) comprising a first inner surface (53, 54, 55) radially facing a first outer surface (44) of the first gasket (16); the first clamp ring (16) comprising an inwardly extending annular first side wall (50, 51, 52); an arcuate second clamp ring (116) having a first longitudinal edge (128A) and a second longitudinal edge (128B); a second connecting assembly (118) configured to tighten the second clamp ring (116) to the fluid conduit (19) from a non-actuated position to a tightened position; an arcuate second gasket (125) configured to be positioned radially between the second clamp ring (116) and the fluid conduit (19); an arcuate middle ring (17) configured to extend axially between the first clamp ring (16) and the second clamp ring (116); the middle ring (17) comprising an outwardly extending annular first flange (23); at least a portion (84) of the first flange (23) of the middle ring (17) disposed axially between and radially overlapping (90) at least a portion (66) of the first side wall (50, 51, 52) of the first clamp ring (16) and at least a portion (47) of an annular first side surface (41) of the first gasket (25); the first annular flange (23) of the middle ring (17) comprising an axially extending first retention rim (85); the first retention rim (85) of the first annular flange (23) of the middle ring (17) axially overlapping (91) and disposed radially between a first retained portion (47) of the first outer surface (44) of the first gasket (25) and a first opposed portion (53) of the first inner surface (53, 54, 55) of the first clamp ring (16); and the first retention rim (85) of the first annular flange (23) of the middle ring (17) and the first retained portion (47) of the first outer surface (44) of the first gasket (25) forming a gasket retaining element restraining radial movement of the first side surface (41) of the first gasket (25) relative to the first flange (23) of the middle ring (17).

The first retention rim (85) may comprise an arcuate inwardly facing first retention surface (73) in opposed orientation to the first retained portion (47) of the first outer surface (44) of the first gasket (25). The first retention surface (73) of the first retention rim (85) may comprise a cylindrical surface concentric with the fluid conduit (19). The first retention surface of the first retention rim may comprise multiple separate circumferentially arranged and spaced apart inwardly facing first retention surfaces in opposed orientation to the first retained portion of the first outer surface of the first gasket.

The first clamp ring (16) may comprise an outwardly extending inwardly facing first groove portion (63) forming the first opposed portion (53) of the first inner surface (53, 54, 55) of the first clamp ring (16) and providing a radial gap (95) between the radially facing first retained portion (47) of the first outer surface (44) of the first gasket (25) and the first opposed portion (53) of the first inner surface (53, 54, 55) of the first clamp ring (16).

The second clamp ring (116) may comprise a second inner surface radially facing a second outer surface of the second gasket; the second clamp ring (116) may comprise an inwardly extending annular second side wall; the middle ring (17) may comprise an outwardly extending annular second flange (123); at least a portion of the second flange (123) of the middle ring (17) may be disposed axially between and radially overlap at least a portion of the second side wall of the second clamp ring (116) and at least a portion of an annular second side surface of the second gasket (125); the second annular flange (123) of the middle ring (17) may comprise an axially extending second retention rim; the second retention rim of the second annular flange (123) of the middle ring (17) may axially overlap and be disposed radially between a second retained portion of the second outer surface of the second gasket (125) and a second opposed portion of the second inner surface of the second clamp ring (116); and the second retention rim of the second annular flange (123) of the middle ring (17) and the second retained portion of the second outer surface of the second gasket (125) may form a gasket retaining element restraining radial movement of the second side surface of the second gasket relative to the second flange (123) of the middle ring (17).

The conduit coupling assembly may comprise a spanner (26) configured to extend across a longitudinal ring gap (29) between the first longitudinal edge (28A) and the second longitudinal edge (28B) of the first clamp ring (16). The first gasket (25) may comprise an outer gasket layer (40) and a separate inner gasket layer (30) and the inner and outer gasket layers configured to be selectively engaged (35, 46) with each other.

DETAILED DESCRIPTION OF THE EMBODIMENTS

Figure 1:
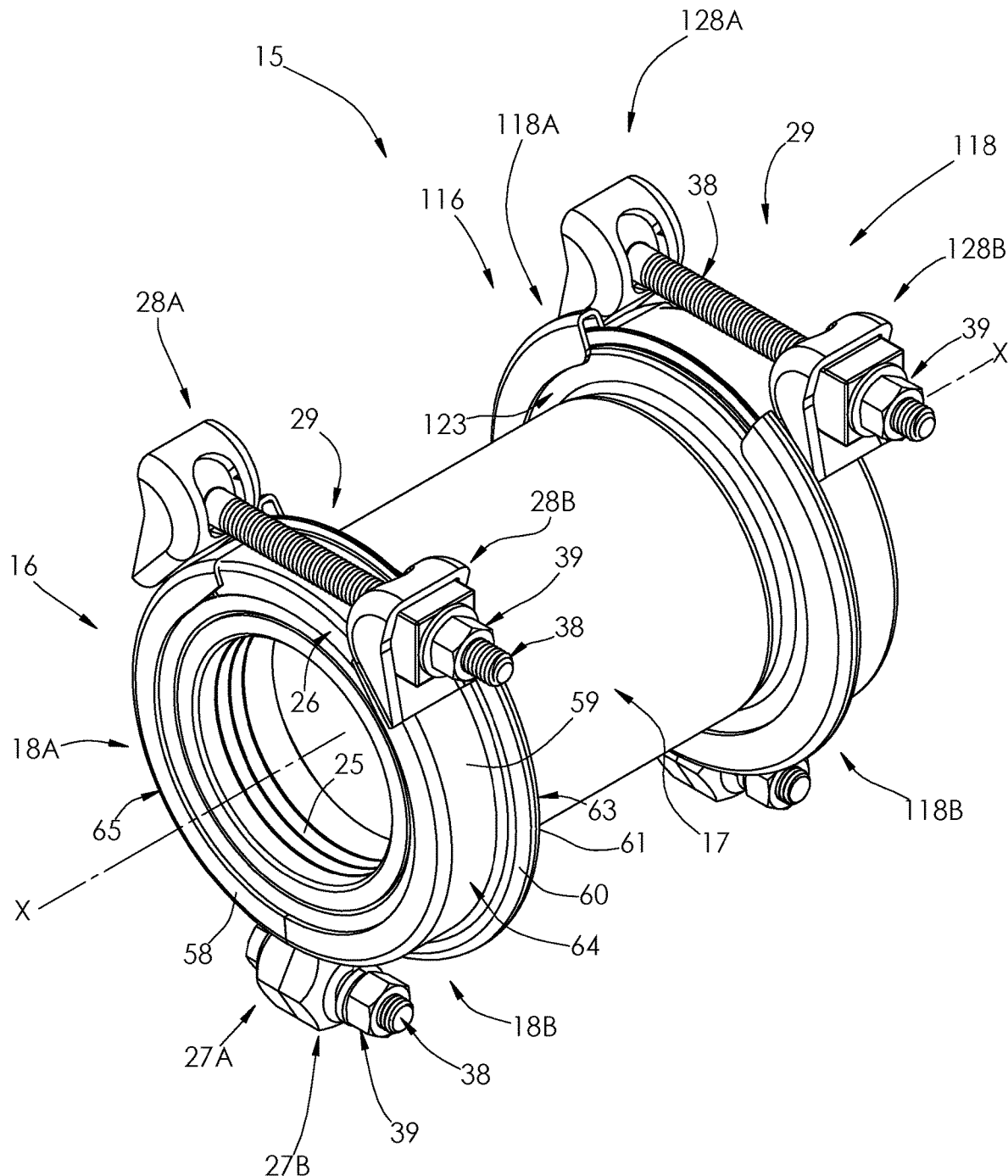
FIG. 1 is a perspective view of an embodiment of the improved assembly.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 2:
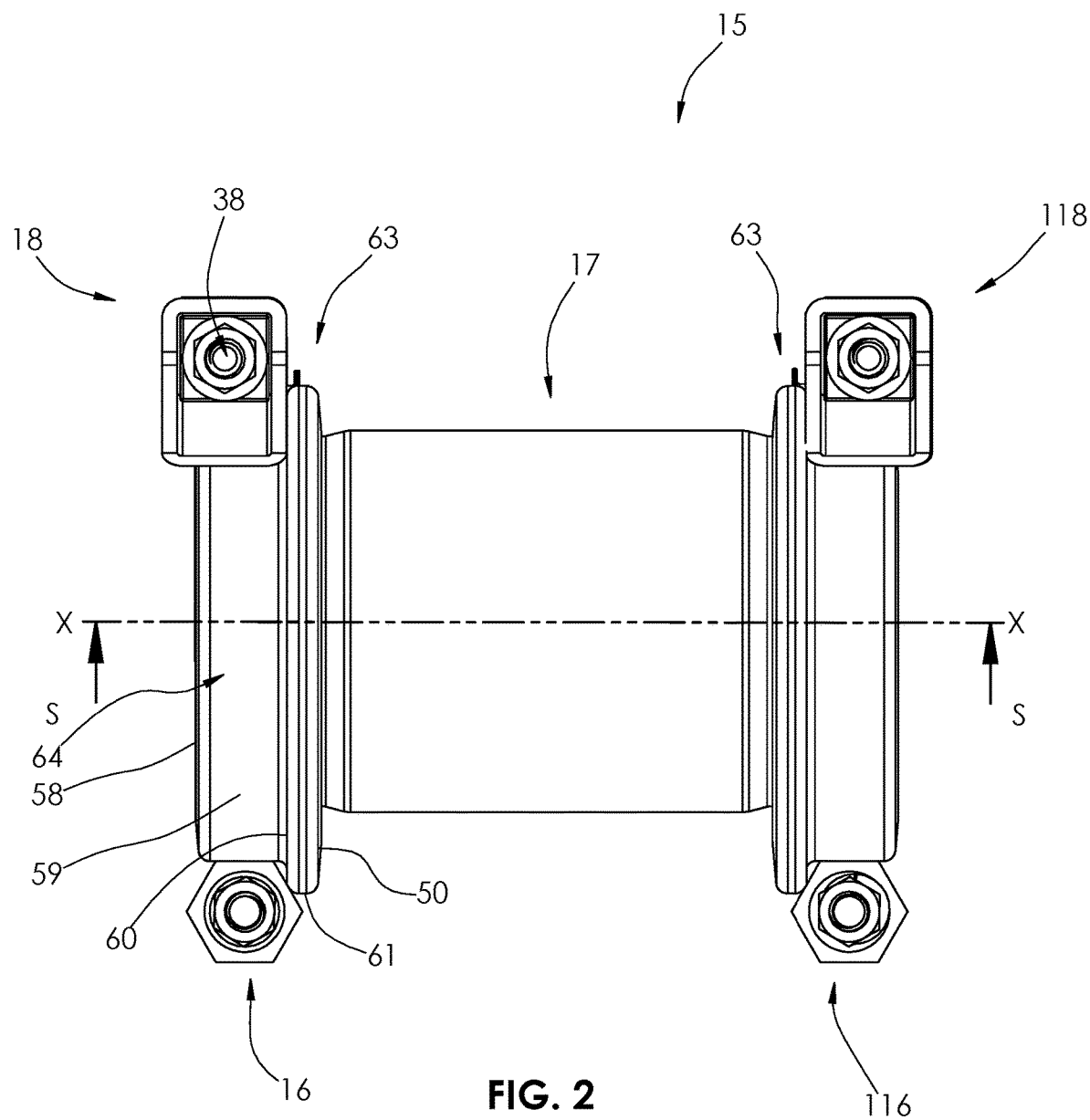
FIG. 2 is a front view of the assembly shown in FIG. 1.
Figure 3:
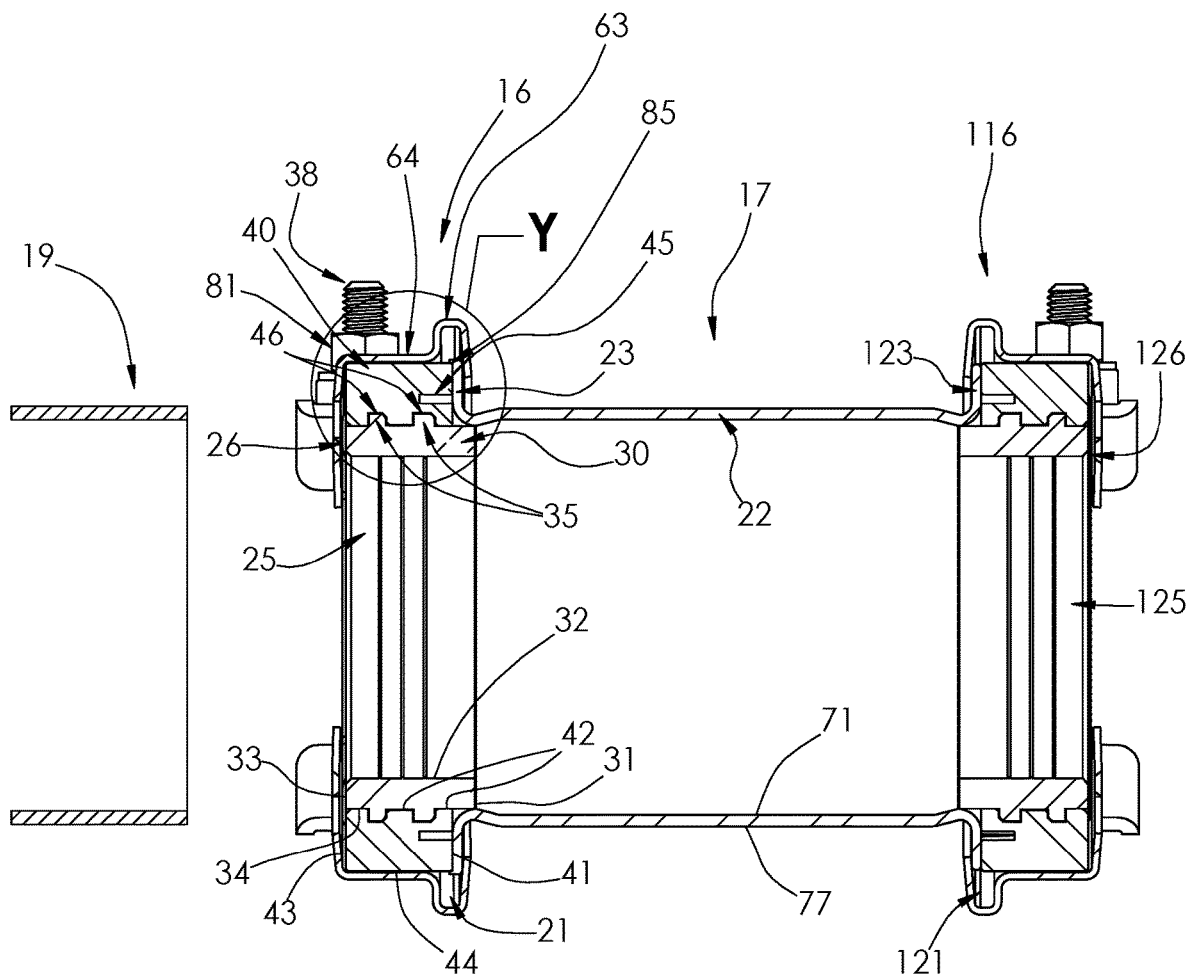
FIG. 3 is a longitudinal horizontal cross-sectional view of the assembly shown in FIG. 2, taken generally on line S-S of FIG. 2.

Referring now to the drawings, and more particularly to FIGS. 1-3 thereof, an improved pipe coupling assembly is provided, of which a first embodiment is generally indicated at 15. As shown, assembly 15 generally comprises middle encapsulation sleeve or ring 17 and two end ring gasket assemblies comprising end rings 16 and 116, end spanners 26 and 126, and end gaskets 25 and 125, respectively, which surround pipe 19. Middle ring 17, end rings 16 and 116, end gaskets 25 and 125, and pipe 19 are all generally ring-like cylindrical structures orientated about axis x-x. In operation, middle ring 17, end rings 16 and 116, and end gaskets 25 and 125 are circumferentially disposed on the outside of pipe 19.

End rings 16 and 116 overlap the respective annular flanged edges 23 and 123 of middle ring 17. End ring 16 includes semi-cylindrical half ring 18A and semi-cylindrical half ring 18B, which are bolted together via tightening assembly 18 to encapsulate pipe 19. Semi-cylindrical half ring 18A and semi-cylindrical half ring 18B include abutting ends 27A and 27B and spaced ends 28A and 28B, respectively. Abutting ends 27A and 27B are configured to be securely coupled together in a generally gap-free relationship as shown in FIG. 1. With abutting ends 27A and 27B coupled via bolt 38 and nut 39, spaced ends 28A and 28B define a variable gap 29 therebetween. Spaced end 28A of half ring 18A includes a first bolt lug projecting radially outwardly from spaced end 28A. Similarly, spaced end 28B of half ring 18B includes a second bolt lug projecting radially outwardly from spaced end 28B. Half ring 18A and half ring 18B are thereby connected and tightened around pipe 19 via bolt 38, extending between openings in the respective lugs, and corresponding nut 39. Similarly, end ring 116 includes semi-cylindrical half ring 118A and semi-cylindrical half ring 118B, which are bolted together via tightening assembly 118 to encapsulate pipe 19. Half ring 118A and half ring 118B are thereby connected and tightened around pipe 19 via bolt 38 and corresponding nut 39.

End gaskets 25 and 125 are configured to wrap around and encircle pipe 19 between the outer surface of pipe 19 and inner pockets 21 and 121 of end rings 16 and 116, respectively, of assembly 15 to form a seal, with end gaskets 25 and 125 sealing on pipe 19. Assembly 15 is thereby configured and arranged to be tightened around pipe 19.

End gaskets 25 and 125 are disposed generally between the inner annular surfaces of end rings 16 and 116 and end spanners 26 and 126, the inner cylindrical surfaces of rings 16 and 116 and end spanners 26 and 126, the outer annular surface of flanges 23 and 123 of middle ring 17, respectively, and the outer cylindrical surface of pipe 19. Thus, end gaskets 25 and 125 are sandwiched between the inside cylindrical surfaces of end rings 16 and 116 and end spanners 26 and 126 and the outside cylindrical surface of conduit 19 to provide sufficient sealing force to prevent leakage of fluid. Elastic or sealing energy is imparted into assembly 15 by tightening end rings 16 and 116 from a loosened or a non-actuated position to a tightened sealed position.

As shown in FIGS. 1-7, each of end gaskets 25 and 125 comprises two nested gasket split-ring layers 30 and 40 that can be separated from each other. Each end gasket 25 and 125 comprises outer gasket split-ring 40 and removable inner gasket split-ring 30. Inner split-ring or layer 30 may be removed from outer split-ring or layer 40.

As shown in FIG. 3, outer split ring gasket 40 is a specially-configured ring-shaped solid penannular member elongated along axis x-x, and is generally bounded by rightwardly-facing vertical annular surface 41, inwardly-facing horizontal cylindrical surface 42, leftwardly-facing vertical annular surface 43, and outwardly-facing horizontal cylindrical surface 44, joined at its right marginal end to the outer marginal end of surface 41. As shown, surface 41 includes annular pressure assist cavity 45 to aid in sealing to pipe 19 under compressive pressure, and surface 42 includes annular channels 46 extending into surface 42.

As shown in FIG. 3, inner split ring gasket 30 is a specially-configured ring-shaped solid penannular member elongated along axis x-x and is generally bounded by rightwardly-facing vertical annular surface 31, inwardly-facing horizontal cylindrical surface 32, leftwardly-facing vertical annular surface 33, and outwardly-facing horizontal cylindrical surface 34, joined at its right marginal end to the outer marginal end of surface 31. As shown, surface 34 includes first splines 35 extending outwardly from surface 34.

Splines 35 of inner gasket 30 are orientated in a plane substantially perpendicular to axis x-x and mate with channels 46 of outer gasket 40, respectively. Inner gasket split-ring 30 is manually removable from outer gasket split-ring 40 to allow end gaskets 25 and 125 to be installed on an oversize pipe. Inner split-ring 30 and outer split-ring 40 are loosely connected to each other via annular splines 35 of inner gasket 30 being nested in annular channels 46, respectively, such that inner split-ring 30 is adapted to be removed from outer split-ring 40 at a predetermined location. This allows end gaskets 25 and 125 to be used with pipes of substantially different diameters. For pipes of greater outer diameter, inner split-ring 30 is manually separated from outer split-ring 40 and just outer split-ring 40 is used as the end gasket.

As shown, inner gasket layer 30 has an axial width between side surfaces 31 and 33 that is greater than the axial width between side surfaces 41 and 43 of outer gasket layer 40. As shown, outer split-ring 40 does not entirely overlap inner split-ring 30. Inner split-ring 30 has outer axial width along axis x-x and outer split ring 40 has outer axial width along axis x-x less than the axial width of inner split ring 30.

Split-ring end gaskets 25 and 125 are formed of a resilient material and are cut radially so as to be penannular and not form a full ring. Thus, instead of being a full continuous annular ring, a radial break or gap is provided through each layer 30 and 40 at a circumferential location. Thus, each layer 30 and 40 has a radial split through the entire gasket cross-section. The edges of the gap may thereby be manually separated or pulled apart from each other to form a more open C-shaped member. Once installed on pipe 19, the opposed ends of the split-ring gasket layers 30 and 40 will move back towards each other and the gap will close up.

To bridge gap 29 that is formed between spaced ends 28A and 28B of end ring 16, end spanner plate 26, orientated transverse to axis x-x, is employed to provide gasket compression across gap 29. End spanner 26 is generally S-shaped in cross section and has an arcuate shape along its length. Spanner 26 is a metallic strip that spans arc-shaped gap 29 between opposed edges 28A and 28B of end ring 16. The interior edges and surfaces of end ring 16 that are in contact with spanner 26 apply a normal force or pressure that is directed radially inward toward the center axis of pipe 19, which develops the necessary sealing pressure between spanner 26 and pipe 19. Spanner 26 is designed to compress gasket 25 across gap 29 between longitudinal edges 28A and 28B of end ring 16. The opposed spaced ends 28A and 28B of end ring 16 are intended to slide, translate or slip over the outer surface of spanner 26, and thereby provide diameter reduction and gasket compression upon the tightening of connection assembly 18. As nut 39 is tightened on bolt 38 of connection assembly 18, a radially orientated inward force is applied to spanner 26 and the opposed lugs of opposed ends 28A and 28B of end ring 16 are drawn together, thereby tightening assembly 15 to pipe 19.

Figure 5:
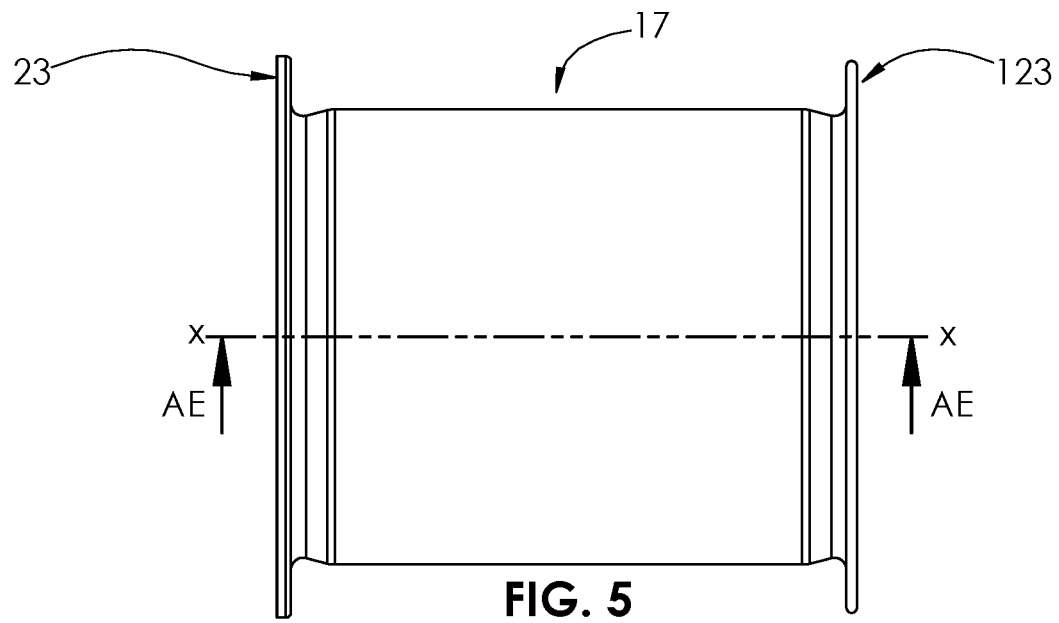
FIG. 5 is a front view of the middle ring shown in FIG. 2.
Figure 6:
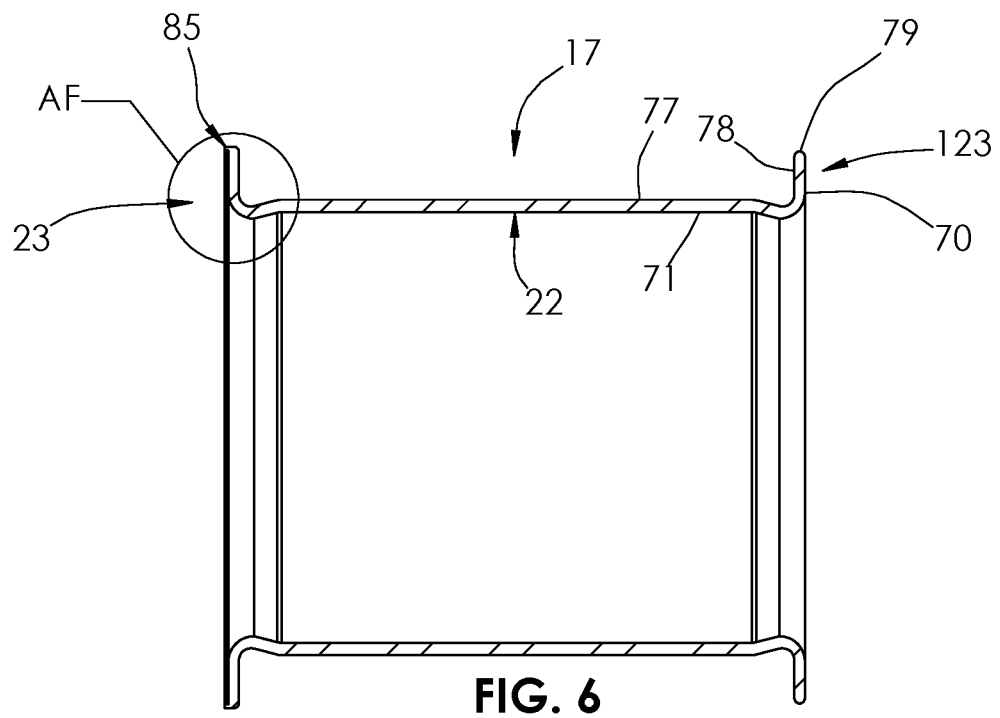
FIG. 6 is a longitudinal horizontal cross-sectional view of the middle ring shown in FIG. 5, taken generally on line AE-AE of FIG. 5.
Figure 7:
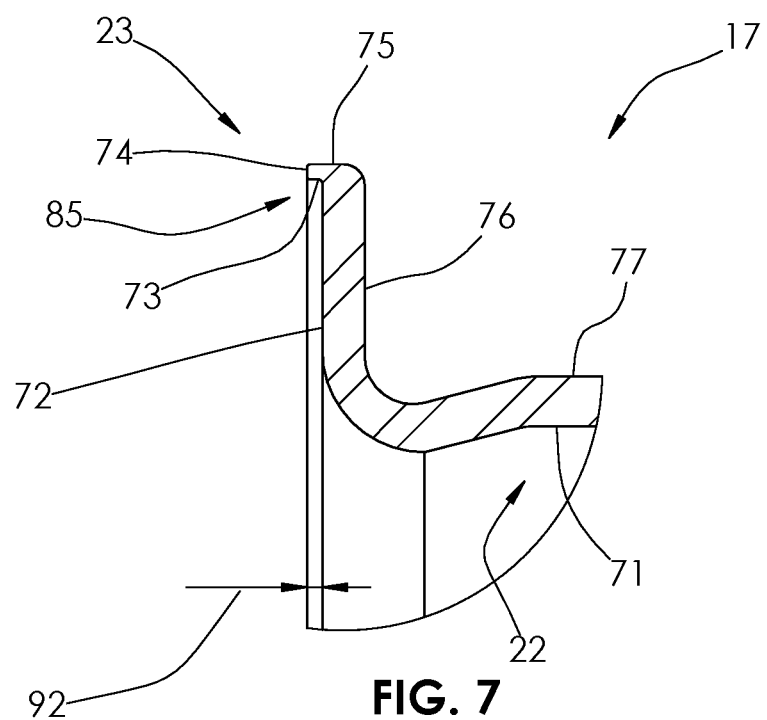
FIG. 7 is an enlarged longitudinal horizontal cross-sectional view of the middle ring shown in FIG. 6, taken generally within the indicated circle AF of FIG. 6.

As shown in FIGS. 5-7, middle ring 17 is a specially-configured cylindrical ring-shaped annular member elongated along axis x-x, and is generally bounded by rightwardly-facing vertical annular surface 70, inwardly-facing horizontal cylindrical surface 71, leftwardly facing vertical annular surface 72, inwardly-facing horizontal cylindrical surface 73, leftwardly-facing vertical annular surface 74, outwardly-facing horizontal cylindrical surface 75, rightwardly-facing vertical annular surface 76, outwardly-facing horizontal cylindrical surface 77, leftwardly-facing vertical annular surface 78, and outwardly-facing horizontal cylindrical surface 79, joined at its right marginal end to the outer marginal end of surface 70. Surfaces 71 and 77 of middle ring 16 generally define cylindrical horizontal center portion 22. Surfaces 72, 73, 74, 75 and 76 of middle ring 16 generally define annular flange portion 23 that extends radially outward from the left end of center portion 22. Surfaces 70, 78 and 79 of middle ring 16 generally define annular flange portion 123 that extends radially outward from the right end of center portion 22. Surfaces 73 and 74 generally define cylindrical retaining shoulder or rim 85.

Figure 4:
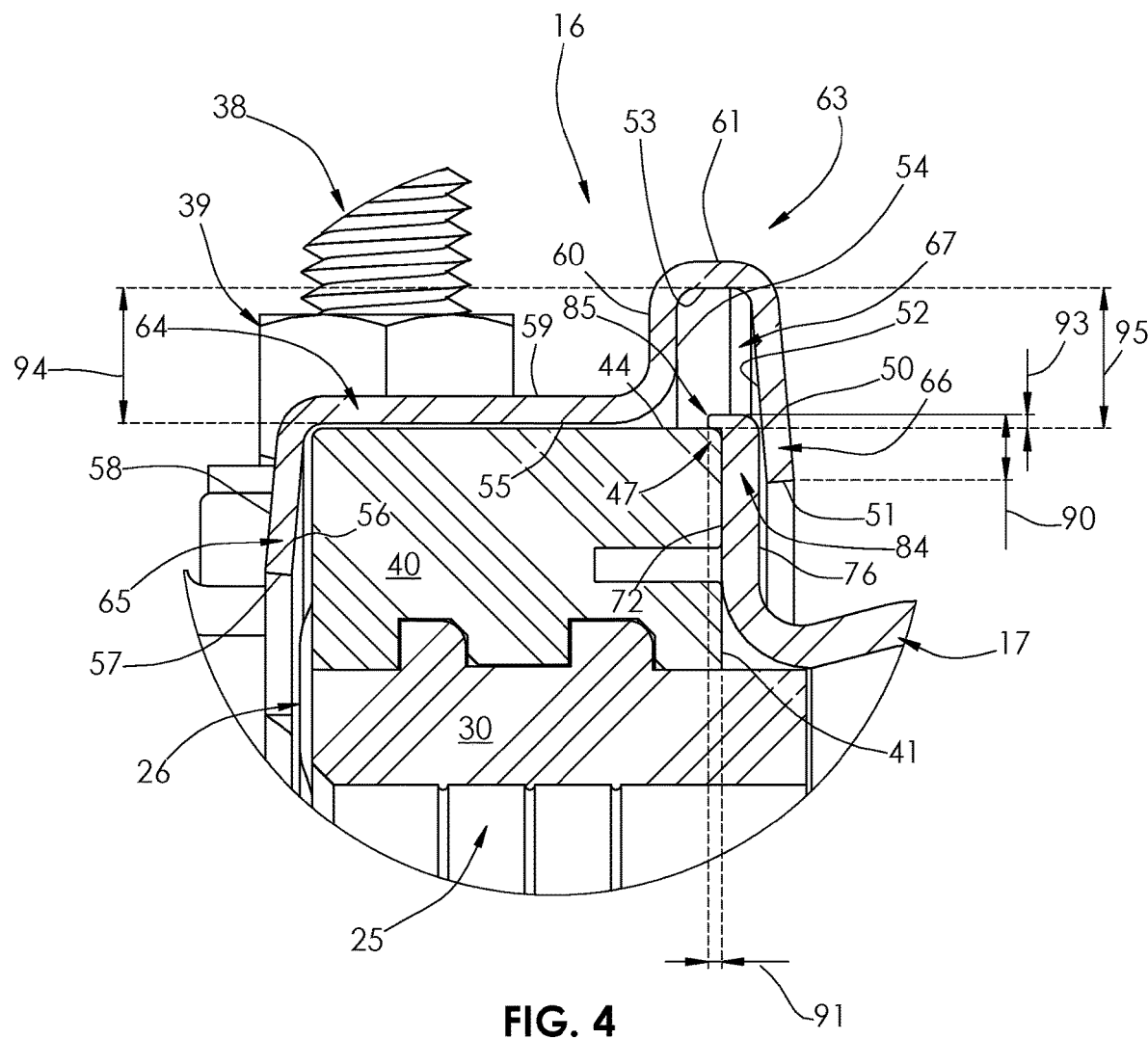
FIG. 4 is an enlarged longitudinal horizontal cross-sectional view of the assembly shown in FIG. 3, taken generally within the indicated circle Y of FIG. 3.

As shown in FIG. 4, clamp ring 16 is a specially-configured ring-shaped solid penannular member elongated along axis x-x, and is generally bounded by rightwardly and slightly outwardly-facing frusto-conical surface 50, inwardly-facing horizontal cylindrical surface 51, leftwardly and slightly inwardly-facing frusto-conical surface 52, inwardly-facing horizontal cylindrical surface 53, rightwardly-facing vertical annular surface 54, inwardly-facing horizontal cylindrical surface 55, rightwardly and slightly inwardly-facing frusto-conical surface 56, inwardly-facing horizontal cylindrical surface 57, leftwardly and slightly outwardly-facing frusto-conical surface 58, outwardly-facing horizontal cylindrical surface 59, leftwardly-facing vertical annular surface 60, and outwardly-facing horizontal cylindrical surface 61, joined at its right marginal end to the outer marginal end of surface 50. Surfaces 55 and 59 of end ring 16 generally define cylindrical horizontal center portion 64. Surfaces 50, 51, 52, 53, 54 60 and 61 generally define inwardly facing generally U-shaped (in cross section) groove portion 63 that extends radially outward from the inner end of center portion 64. Surfaces 56, 57 and 58 generally define annular outer portion 65 extending radially inward from the outer end of center portion 64. When assembled, inner surfaces 55 and 53 of end ring 16 radially face outer surface 44 of gasket 25. And surface 53 is orientated radially outward from surface 55 of end ring 16 by radial distance 94 such that first gasket groove portion 63 forms cavity 67 having radial gap 95 between radially facing outer surface 44 of gasket 25 and opposed inner surface 53 of end ring 16. Retaining rim 85 extends into cavity 67 between inner surface 53 of groove portion 63 of end ring 16 and outer surface 44 of gasket 25.

As shown in FIG. 4, the inside branch of groove portion 63 includes end portion 66 that is configured to radially overlap end portion 84 of annular flange 23 of middle ring 17 by radial overlap 90. When assembled, end portion 84 of flange 23 of middle ring 17 is disposed axially between end portion 66 of groove portion 63 of clamp ring 16 on side 76 and a portion of surface 41 of gasket 25 on side 72. Thus, axially abutting surfaces 76 and 52 of flange 23 of middle ring 17 and end portion 66 of end ring 16, respectively, retain end ring 16 such that end ring 16 is restrained from moving axially to the left relative to middle ring 17.

When assembled, at least annular shoulder or rim 85 of end flange 23 axially overlaps corner portion 47 of gasket 25 to the outside of surface 44 of gasket 25, thereby retaining corner 47 of gasket 25 such that surface 41 of gasket 25 is restrained from moving radially outward relative to surface 72 of flange 23 of middle ring 17. Axially extending retention rim 85 of annular flange 23 of middle ring 17 is configured to axially overlap surface 44 of gasket 25 by axial overlap 91. When assembled, retention rim 85 of annular flange 23 of middle ring 17 is disposed radially between retained portion 47 of outer surface 44 of gasket 25 on side 73 and surface 53 of U-shaped portion 63 of clamp ring 16 on side 75. Radially abutting surfaces 73 and 44 of middle ring 17 and gasket 25, respectively, retain gasket 25 such that gasket is restrained from moving radially outward. Thus, retention rim 85 of annular flange 23 of middle ring 17 and retained portion 47 of outer surface 44 of gasket 25 form a gasket retaining element restraining radial movement of annular side surface 41 of gasket 25 relative to side surface 72 of flange 23 of middle ring 17. Although the surfaces are shown as being substantially cylindrical or annular, other cross-sectional profiles, shapes, or contours could be used to form a retaining shoulder or protrusion.

Gasket 25 is thereby mounted concentrically in retaining portion 21 of end ring 16 such that it does not move axially out of retaining portion 21. At least a portion of gasket 25 is captured axially between surface 56 of outer portion 65 of end ring 16 and surface 72 of flange 23 of middle ring 17. At least a portion of gasket 25 is captured radially between surface 55 of center portion 64 of end ring 16 and pipe 19. At least a portion of gasket 25 is captured radially between surface 73 of shoulder 85 of end flange 23 of middle ring 17 and pipe 19. Thus, outer portion 65 of end ring 16, center portion 64 of end ring 16, retaining rim 85 of middle ring 17, and flange 23 of middle ring 17 collectively define gasket seat 21 for split-ring gasket 25.

Retaining rim 85 of middle ring 17 provides a number of unexpected benefits over the prior art. For example, and without limitation, retaining rim 85 locates and positions gasket 25 so that gasket 25 does not move and is retained in seat 21 instead of sliding around relative to sleeve 16 and 17. Retaining rim 85 provides improved control over and uniformity of gasket pressure in the vicinity and region of gasket end 41. Retaining rim 85 retaining depth 91 can be selected to control overall gasket compression. Retaining rim 85 provides for increased seal pressure and seal reliability and provides an improved circumferential seal when assembly 18 is tightened and assists in the progressive seal that occurs during installation and bolt tightening.

End ring 116, end spanner 126, and end gasket 125 are configured and function substantially the same as end ring 16, end spanner 26 and end gasket 25. End flange 123 of middle ring 17 may also be configured and function substantially the same relative to end ring 116 and end gasket 125 as end flange 23 relative to end ring 16 and end gasket 25.

The present invention contemplates that many changes and modifications may be made. Therefore, while forms of the improved coupling assembly have been shown and described, and a number of alternatives discussed, persons skilled in this art will readily appreciate that various additional changes and modifications may be made without departing from the scope of the invention, as defined and differentiated by the claims.

What is claimed is:

1. A conduit coupling assembly configured to clamp to a fluid conduit oriented about a longitudinal axis comprising:
   an arcuate first clamp ring having a first longitudinal edge and a second longitudinal edge;
   a first connecting assembly configured to tighten said first clamp ring to said fluid conduit from a non-actuated position to a tightened position;
   an arcuate first gasket configured to be positioned radially between said first clamp ring and said fluid conduit;
   said first clamp ring comprising a first inner surface radially facing a first outer surface of said first gasket;
   said first clamp ring comprising an inwardly extending annular first side wall;
   an arcuate second clamp ring having a first longitudinal edge and a second longitudinal edge;
   a second connecting assembly configured to tighten said second clamp ring to said fluid conduit from a non-actuated position to a tightened position;
   an arcuate second gasket configured to be positioned radially between said second clamp ring and said fluid conduit;
   an arcuate middle ring configured to extend axially between said first clamp ring and said second clamp ring;
   said middle ring comprising an outwardly extending annular first flange;
   at least a portion of said first flange of said middle ring disposed axially between and radially overlapping at least a portion of said first side wall of said first clamp ring and at least a portion of an annular first side surface of said first gasket;
   said first annular flange of said middle ring comprising an axially extending first retention rim;
   said first retention rim of said first annular flange of said middle ring axially overlapping and disposed radially between a first retained portion of said first outer surface of said first gasket and a first opposed portion of said first inner surface of said first clamp ring; and
   said first retention rim of said first annular flange of said middle ring and said first retained portion of said first outer surface of said first gasket forming a gasket retaining element restraining radial movement of said first side surface of said first gasket relative to said first flange of said middle ring.

2. The conduit coupling assembly set forth in claim 1, wherein said first retention rim comprises an arcuate inwardly facing first retention surface in opposed orientation to said first retained portion of said first outer surface of said first gasket.

3. The conduit coupling assembly set forth in claim 2, wherein said first retention surface of said first retention rim comprises a cylindrical surface concentric with said fluid conduit.

4. The conduit coupling assembly set forth in claim 2, wherein said first retention surface of said first retention rim comprises multiple separate circumferentially arranged and spaced apart inwardly facing first retention surfaces in opposed orientation to said first retained portion of said first outer surface of said first gasket.

5. The conduit coupling assembly set forth in claim 1, wherein said first clamp ring comprises an outwardly extending inwardly facing first groove portion forming said first opposed portion of said first inner surface of said first clamp ring and providing a radial gap between said radially facing first retained portion of said first outer surface of said first gasket and said first opposed portion of said first inner surface of said first clamp ring.

6. The conduit coupling assembly set forth in claim 1, wherein:
   said second clamp ring comprises a second inner surface radially facing a second outer surface of said second gasket;
   said second clamp ring comprises an inwardly extending annular second side wall
   said middle ring comprises an outwardly extending annular second flange;
   at least a portion of said second flange of said middle ring is disposed axially between and radially overlaps at least a portion of said second side wall of said second clamp ring and at least a portion of an annular second side surface of said second gasket;
   said second annular flange of said middle ring comprises an axially extending second retention rim;
   said second retention rim of said second annular flange of said middle ring axially overlaps and is disposed radially between a second retained portion of said second outer surface of said second gasket and a second opposed portion of said second inner surface of said second clamp ring; and said second retention rim of said second annular flange of said middle ring and said second retained portion of said second outer surface of said second gasket form a gasket retaining element restraining radial movement of said second side surface of said second gasket relative to said second flange of said middle ring.

7. The conduit coupling assembly set forth in claim 1, comprising a spanner configured to extend across a longitudinal ring gap between said first longitudinal edge and said second longitudinal edge of said first clamp ring.

8. The conduit coupling assembly set forth in claim 1, wherein said first gasket comprises an outer gasket layer and a separate inner gasket layer and said inner and outer gasket layers configured to be selectively engaged with each other.

* * * * *